United States Patent
Barak et al.

(10) Patent No.: US 7,970,355 B2
(45) Date of Patent: Jun. 28, 2011

(54) METHOD AND DEVICE FOR WIRELESS COMMUNICATION USING MIMO TECHNIQUES

(75) Inventors: Oz Barak, Hod Hasharon (IL); Assaf Touboul, Natanya (IL); Avner Dor, Ramat Gan (IL)

(73) Assignee: Designart Networks Ltd, Ra'anana (IL)

( * ) Notice: Subject to any disclaimer, the term of this patent is extended or adjusted under 35 U.S.C. 154(b) by 654 days.

(21) Appl. No.: 11/949,791

(22) Filed: Dec. 4, 2007

(65) Prior Publication Data

US 2009/0143017 A1    Jun. 4, 2009

(51) Int. Cl.
*H04B 1/00* (2006.01)
*H04B 15/00* (2006.01)

(52) U.S. Cl. ........ 455/63.1; 455/65; 455/69; 455/114.2; 455/126

(58) Field of Classification Search .............. 455/24, 455/63.1, 65, 69, 562.1, 114.2, 126, 278.1, 455/296
See application file for complete search history.

(56) References Cited

U.S. PATENT DOCUMENTS

2006/0155798 A1* 7/2006 Ketchum et al. ............. 708/607
2006/0234645 A1* 10/2006 Lin et al. ..................... 455/69

\* cited by examiner

*Primary Examiner* — Tuan Pham
(74) *Attorney, Agent, or Firm* — Deborah Gador

(57) ABSTRACT

The present invention describes a method of closed loop MIMO communication utilizing implicit or explicit channel state information (CSI) at the transmitter and the receiver. The transmitter performs linear pre-processing (for example, QR decomposition or bi-diagonal decomposition or Jacobi rotations, and/or sporadic SVDs) on a channel matrix, and the receiver mitigates the mutual interference between the streams by performing MMSE processing on the received signals. The MMSE matrix is computed with respect to the processed channel that may estimated by the receiver through preprocessed pilot signals. The transmitters preprocessing is of much lesser cost and complexity than full SVD.

14 Claims, 1 Drawing Sheet

METHOD AND DEVICE FOR WIRELESS COMMUNICATION USING MIMO TECHNIQUES

FIELD OF THE INVENTION

The present invention relates to wireless communications networks, in general and, in particular, to communications networks utilizing MIMO techniques.

BACKGROUND OF THE INVENTION

Multiple-Input Multiple-Output (MIMO) systems utilize multiple antennas at the transmitter and receiver on both sides of a wireless communication channel. This can increase data rates without requiring additional power, by permitting concurrent transmittal of several streams of data, and by performing spatial information processing. MIMO schemes enable the transmitter to transform a data stream to multiple streams and send them through multiple transmit antennas. A multiple antenna receiver processes the received streams and reconstructs the original information. In an ideal network, MIMO capacity increases linearly with the number of antennas at the receiver or at the transmitter, whichever is lower.

In a multi antenna setting, the transmitted signal is linearly transformed by the channel matrix, which is a consequence of the physical environment. The essential goal of MIMO techniques is minimization of the streams' mutual interference. This is done by introducing a suitable linear matrix to process the transmitted and received signals such that the streams become close to or entirely separated. Ideally, accurate Channel State Information (CSI), i.e. the channel matrix, is provided to both transmitter and receiver. In reality, only channel estimation or approximation is available, which is established and maintained by sending pilot signals.

MIMO processing may be performed as either an open loop or a closed loop technique. In open loop MIMO, the transmitter has no specific knowledge of the condition of the channel before data signals are transmitted to the receiver. Common open loop receiver schemes include Minimum Mean Squared Error (MMSE) filtering, QR decomposition, Minimum Likelihood (ML) and Zero Forcing (ZF).

In closed loop MIMO, the transmitter can use CSI to pre-process input signals prior to their transmission, where this CSI is obtained and updated through pilot feedback or explicit channel information sent by the receiver to the transmitter. In this manner, performance is improved and the receiver's processing may be simplified. A well-known closed loop method is Singular Value Decomposition (SVD).

A brief survey of the mathematical and algorithmic tools utilized by this invention is as follows. A triangular matrix is a matrix whose non zero entries are all above or all below the main diagonal. In a unitary matrix, the columns are mutually orthogonal unit vectors. QR is the expression of a matrix as a product of a triangular matrix and a unitary matrix. SVD is the expression of a matrix as a product of a diagonal matrix (i.e., triangular matrix whose non zero entries are all on the main diagonal) with two unitary matrices—one on each side. Bi-diagonalization is the expression of a matrix as a product of a bi-diagonal matrix (i.e., triangular matrix whose non zero entries are all on the main diagonal and in one of the second-main diagonals) with two unitary matrices, one on each side. Any matrix can be decomposed in each of these manners.

The literature provides numerous efficient algorithms that compute SVD, QR, and bi-diagonalization with various effective tools that include Householder matrix and Jacobi rotations. Particularly effective algorithms can be found in the book, Gene H. Golub and Charles F. Van Loan: "Matrix Computations" The John Hopkins University Press, Baltimore, Md., Third edition 1996, (hereinafter: [Matrix]) and the lecture notes of Gene H. Golub: (Stanford University, Stanford, USA), "Lectures on Matrix Computations 2004" Apr. 15-Jun. 10, 2004. http://www.mat.uniroma1.it/%7Ebertaccini/seminars/CS339/syllabus.html (hereinafter: [Golub]), and the numerous references mentioned therein.

In the MIMO communication context, when the channel matrix is decomposed into a product of a few product-matrices, a unitary product matrix can be neutralized by linear processing done respectively at the transmitter or the receiver. Linear unitary processing at the receiver and/or the transmitter has the unique desired property that it can decrease the mutual interference of MIMO streams, without affecting transmission energy, and without amplifying the additive noise term. This is due to the special characteristic of a unitary matrix, that it is Euclidean norm invariant ("$\|U \cdot x\| = \|x\|$ for all vector x when U is unitary"). The effective channel matrix is a product of all linear processing with the natural wireless channel. The diagonal elements of the effective channel matrix represent the channel amplification of the respective data streams, while the non diagonal elements represent the strength of mutual interference.

It has been shown that SVD provides the optimal solution for MIMO communication by eliminating all interference (represented by the non-diagonal entries of the resulting channel matrix). However, its formidable complexity and high sensitivity to channel fluctuations and estimation errors make it impractical for rapidly varying channels and call for alternative solutions. A good measure of the strength of the diagonal of a processed channel matrix, i.e., the relative strength of the desired signals compared to their mutual interference, is the Frobenius norm that sums the squares of a.v. (absolute values) of the respective matrix-entries. It is notable that the Frobenius norm of a matrix is invariant under products with unitary matrix, that is, for any matrices H & U such that U is unitary, and H·U is defined, the sum of a.v. of squares of all H entries is equal to sum of a.v. of squares of all H·U entries.

The present invention evolved from two central papers on MIMO wireless transmission. The paper of Emre Telatar: "Capacity of multi-antenna Gaussian channels", 1995 (hereinafter: [Telatar]) showed that when receiver and transmitter both have perfect CSI, an SVD-based scheme achieves maximal throughput and full interference cancellation. The paper of Martin Schubert and Holger Boche, ["Throughput Maximization for Uplink and Downlink Beamforming with Independent Coding", 2003 Conference on Information Sciences and Systems, The Johns Hopkins University, Mar. 12-14, 2003], hereinafter: [Boche], showed—with other works of the same authors—that when only one side (transmitter or receiver) has CSI, MMSE provides the optimal linear beamforming solution.

Another significant relevant work is that of Guillaume Lebrun et al, [Guillaume Lebrun, Jason Gao, and Michael Faulkner, "MIMO Transmission Over a Time-Varying Channel Using SVD" IEEE TRANSACTIONS ON WIRELESS COMMUNICATIONS, VOL. 4, NO. 2, MARCH 2005] (hereinafter: [Time-Varying . . . SVD]) which describes a scheme of SVD-based transmitter and MMSE receiver and points to the main advantages of such a combined scheme: optimal throughput when full CSI is provided and effective mitigation of performance degradation when the transmitter CSI is outdated and/or not accurate. This scheme would be called here SVD-MMSE. Their approach is particularly suitable when the communication channel varies over time and frequency and, due to channel estimation limitations, 2 sided SVD shows degradation in performance.

The recently published patent application: [US 2006/0234645 of Lin et al (19 Oct. 2006)] (hereinafter: [LC]) considers also an SVD-MMSE scheme. It realizes at section [0018] that the open loop transmission standard, IEEE 802.11n, where the transmitter has no CSI, makes MMSE linear filtering a desirable receiver scheme. This patent suggests that the already existing MMSE circuitry can be utilized also for a closed loop transmission scheme, which includes beam-forming by the transmitter. This approach is particularly useful for a mobile station with computing power limited to MMSE filtering. Thus, section [0017] points to the fact that their method enables the benefits of SVD performance when only one side has the expensive circuitry required for SVD. This patent treats the realistic situation where, even when CSI exists, it might be outdated and/or inaccurate due to channel estimation corruption. [LC] suggests a solution to this situation suitable for slowly varying TDD (time-division duplex) channels. Section [0020] of [LC] describes an interesting and useful scheme in which a wireless radio (e.g. mobile), incapable of computing its own SVD, can use the received signals to conclude the required SVD processing matrix for its transmit signals.

To summarize the motivation of the present invention, it will be appreciated by those skilled in the art that SVD is an expensive application whose circuitry and utilization should be eliminated or minimized. Therefore, it would be desirable to have an effective closed loop MIMO system providing linear processing at the transmitter and at the receiver that does not require SVD circuitry, or utilizes a diluted form of SVD.

SUMMARY OF THE INVENTION

The present invention describes a method of closed loop MIMO communication utilizing implicit or explicit channel state information (CSI) at the transmitter and the receiver. The transmitter performs unitary linear pre-processing of given input signals and the receiver further mitigates the mutual interference between the streams by performing MMSE processing on the received signals. The MMSE matrix is computed with respect to the transmitter-processed channel. The resulting throughput comes close to the optimum (realized by the SVD scheme). This is accomplished without the expensive circuitry and computational complexity required by a full SVD solution. In addition, this method has increased stability amid channel fluctuations and channel estimation's noise. One preferred embodiment of the present invention provides a MIMO communication method that includes the following steps. The transmitter performs non-SVD decomposition of a channel matrix to a product that includes a unitary matrix (or matrices) and a first processed channel matrix. The transmitter then transmits pilot and data signals multiplied by one or more of these calculated unitary matrices. In the next step, the receiver utilizes the pilot signals to estimate the composite channel and processes the data signals by an MMSE filter formed from this estimated channel. The resulting final [i.e. post MMSE] effective channel-matrix has (statistically) enhanced diagonal with respect to Frobenius norm. When the transmitter and the receiver switch roles, the approximated CSI becomes available to the current transmitter via the above mentioned pilot signals. According to various embodiments of the invention, the first processed channel matrix can be a general triangular matrix (following QR decomposition), or a bi-diagonal matrix (following bi-diagonal decomposition), which is a triangular matrix with two non zero diagonals.

Another embodiment utilizes Jacobi rotations to increase the diagonal mass (measured by Frebenius norms) of the first processed channel matrix, thus increasing the strength of the desired signal and reducing interference. Application of Jacobi rotations can be in a stand-alone mode or as enhancement to other embodiments, and is performed to the extent that computational resources permit. In another embodiment, the transmitter computes SVD periodically, on a subset of the frequency sub-carriers, resulting in a diagonal matrix (i.e. triangular matrix with values concentrated on the main diagonal). The preprocessing capabilities are then enhanced in the rest of the sub-carriers by combining the SVD with QR decomposition or Jacobi rotations.

SVD computation becomes more efficient by another aspect of the invention that enables a smaller search window of the related eigenvalues.

In summary, the premise of the present invention is that an optimal transmission scheme, based on SVD, is an expensive asset whose circuitry and utilization should be avoided or minimized. The invention thus provides a low cost, high-performance robust alternatives in which the transmitter carries out a QR or bi-diagonalization and/or Jacobi rotations and/or sporadic SVD's and the receiver performs MMSE on the resulting processed channel.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
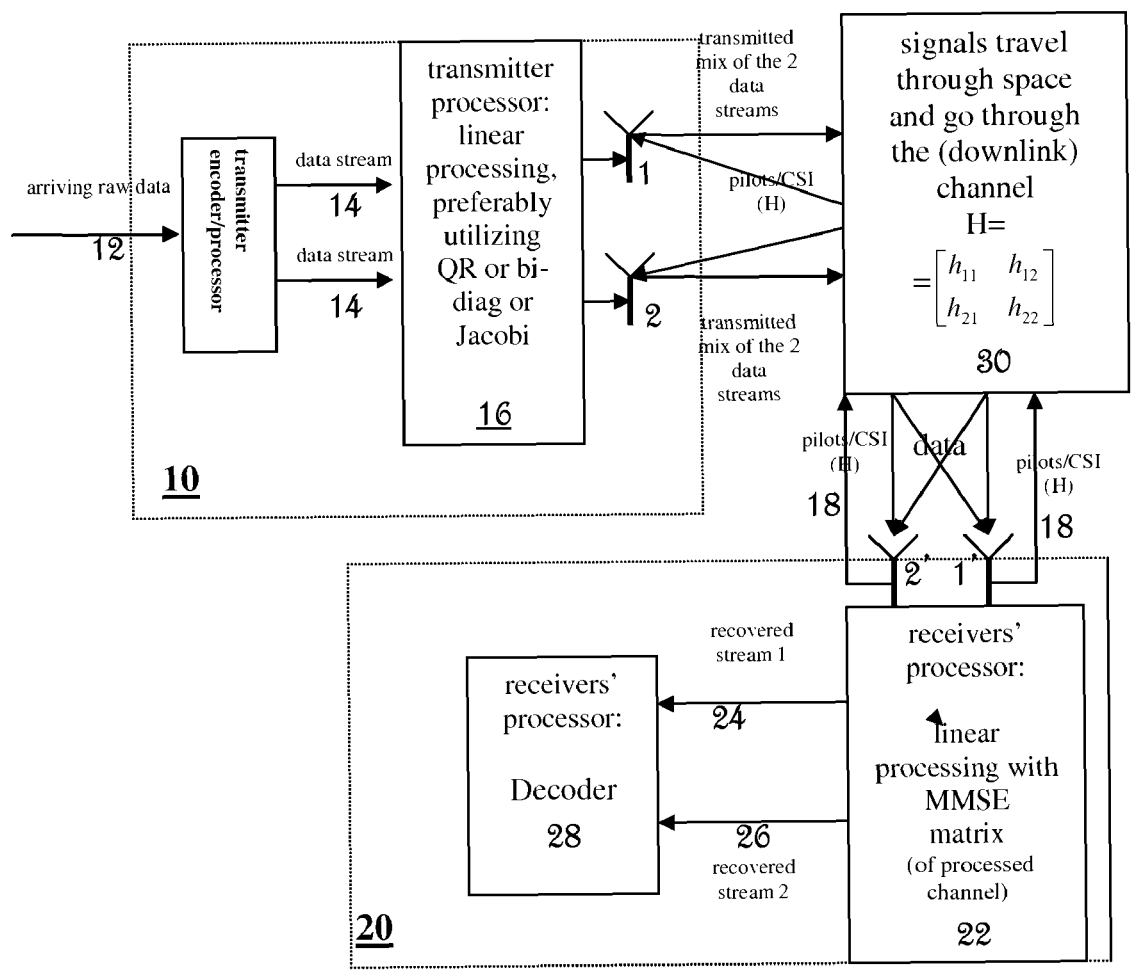
FIG. 1 is a schematic illustration of a MIMO communication method and system, constructed and operative in accordance with one embodiment of the present invention.

The present invention relates to a closed loop MIMO wireless communication technique and device. It provides performance close to that of the optimal SVD, with much less cost in circuitry and calculations. This is accomplished by simplified transmitter's linear pre-processing of the data to be transmitted. The matrix used for this linear pre-processing is a unitary matrix obtained through decomposition of the channel matrix. While the resulting effective channel matrix is typically non-diagonal, its diagonal is statistically enhanced with respect to Frobenius norm. The receiver performs MMSE on the received signals to further mitigate the interference between MIMO streams. The corresponding MMSE matrix is computed by the receiver with respect to the processed channel. It will be appreciated that although this scheme has sub-optimal performance, it is significantly more practical than the optimal SVD scheme. This technique is useful in particular in LTE and WiMAX networks having a backhaul system, like those, for example, described in Applicants' co-pending patent application U.S. Ser. No. 11/623,110 entitled WiMAX Access Point Network with Backhaul Technology.

The method and device are illustrated schematically in FIG. 1, which shows a first transceiver 10 communicating with a second transceiver 20 over a wireless channel 30 that is represented by the matrix H. First transceiver 10 is acting here as a transmitter. As such, it receives data 12 to be transmitted. It also obtains Channel State Information (CSI) through 18, (i.e., approximation of the channel matrix H), implicitly via pilots' feedback coupled with channel estimation and/or through explicit feedback. Data 12 is divided into two or more MIMO data streams 14. Data streams 14 undergo linear processing with a unitary matrix in a processor 16 of transceiver 10. Preferably, this unitary matrix is accomplished by performing QR, or bi-diagonalization, and/or at least one Jacobi rotation on H, and may further include sporadic SVD computations. The pre-processed data of the two initial data streams is now transmitted via antennas 1 and 2 over the wireless channel H to antennas 1' and 2' in transceiver 20, now acting as a receiver. The received data, having been linearly transformed by the channel H, undergoes linear processing with an MMSE matrix in processor 22 of transceiver 20 and the recovered, separated streams 24, 26 are sent to a decoder 28. When the roles of transceivers 10 and 20 are changed, and transceiver 20 acts as a transmitter, it transmits either pilot signals 18 to enable channel estimation or, alternatively, updated explicit CSI received by transceiver 10, now acting as a receiver.

Theory tells us that in MIMO communication, an MMSE receiver is the best linear-processing receiver's scheme for any given linear transmission scheme. This is so when the MMSE is performed on the effective channel, which comprises any existing linear preprocessing by the transmitter. Furthermore, MMSE maximizes each stream's rate independently, compared with any other receiver's linear filter. Based on this observation, some unitary linear preprocessing transmission schemes are considered here, coupled with an MMSE receiver, that exhibit a strong combination of high throughput and low complexity. Such schemes that comprise an MMSE receiver are particularly suitable for back-haul applications in MIMO oriented wireless communications networks, like Wimax and LTE, where the MMSE mechanism is already there for the access (i.e. base station to mobile station communication) purposes. The essential features of the invention: QR-MMSE, bi-diag-MMSE, QR-SVD-MMSE, Jacobi-rotations enhancement and sparsely-applied-SVD, will now by described briefly. Following this sketch, a precise mathematical formulation of these embodiments will be presented. In the subsequent transmission schemes embodying this invention, the receiver has updated effective (processed) channel knowledge—usually estimated though pilots—and the transmitter has at least approximated channel knowledge, based on channel reciprocity in TDD (time-division duplex) or on explicit feedback.

Hybrid QR transmitter and MMSE receiver (QR-MMSE). According to one embodiment of the invention, a relatively low complexity hybrid scheme is utilized, where the transmitter performs unitary linear preprocessing based on QR decomposition, and the receiver performs MMSE on the resulting processed channel. The QR decomposition can be done effectively according to the Householder approach described in [Matrix], cited above. The MMSE computation will be discussed in the sequel. The advantage offered by this scheme is that the effective channel matrix is lower triangular, which means that each subscriber is interfered only by the previous subscribers. This is further enhanced by the MMSE-receiver's capability to minimize interference for any transmit scheme. The simulation results below demonstrate that the QR-MMSE average throughput is about half way between SVD and non-preprocessed MMSE.

Hybrid Bi-diagonalization (bi-diag) transmitter and MMSE receiver (bi-diag-MMSE). According to another embodiment of the invention, the transmitter performs bi-diagonalization (bi-diag) of the channel matrix, utilizing the Householder method of [Matrix] and the receiver performs MMSE on the resulting effective channel. This provides additional interference mitigation that appears to improve the QR-MMSE performance. The computational cost of this scheme is somewhat above QR-MMSE but is much less than SVD. The Householder bi-diag algorithm is similar to that of the QR and is a subroutine of the SVD. The advantage of this scheme, compared with QR-MMSE, occurs when $M \geq 4$ and increases with M ($N \geq M$—see below).

Hybrid QR-MMSE with SVD Enhancement (SVD-QR-MMSE).

Another embodiment enables performance that approaches SVD's performance level by a transmitter scheme that combines sporadic SVD with QR corrections. It can be applied as a low complexity method for overcoming the impact of channel fluctuations and channel estimation errors that degrade the performance of SVD-MMSE. It is particularly suitable for OFDM communication systems where it enables near SVD-scheme performance, however, with SVD calculations done once per relatively long interval of frequencies. This option requires a limited amount of SVD calculations and circuitry, that cannot match the rate of operation required for rapid channel fluctuations. The respective fast SVD algorithm can be based on the Householder method of [Matrix] combined with the below described method that narrows the search interval of eigen-values. It might also be enhanced by the application of Jacobi rotations. This SVD algorithm includes bi-diagonalization as a subroutine, and, with slight modifications, also QR. The premise of the SVD-QR-MMSE scheme is a transmitter that performs, from time to time, full SVD. In between SVDs, the dynamic processed channel drifts away from its original diagonal structure. It then utilizes QR decomposition—i.e. triangularization—at the transmitter to reduce the off-diagonal weight which accounts for interference. As before, the receiver does MMSE on the final processed effective channel. One or more Jacobi rotations can be applied to enhance interference mitigation.

The simulations performed by applicants consider a model of channel with additive channel error. When, for example, the variance of the added error is half the channel variance, the conventional MMSE-SVD scheme loses 15% rate, while this scheme loses only 2% rate, compared with updated SVD. When the added error's variance equals the channel's variance, the conventional MMSE-SVD scheme loses 24% rate, while this scheme loses only 5.5% rate, compared with updated SVD.

Jacobi rotations. (Known also as Givens rotations.) The method of this embodiment applies unitary equivalence with unitary matrices that differ from the unit matrix in only 4 entries, situated on the intersection of two rows and two columns. These matrices are represented by a 2×2 unitary matrix that diagonalizes a chosen 2×2 Hermitian matrix. They are relatively easy to compute in a stable manner through application of the calculations in [Matrix 8.4] and, when applied, they decrease proportionally the off-diagonal mass (measured by Frobenius norm) of the target n×n matrix. The advantage they offer is in being adaptive to the current available real time, advancing diagonalization to the extent that current computational limitations permit. Another advantage is that they can be used both as stand alone, or as enhancement to other unitary preprocessing methods utilized by this invention.

Enhanced SVD. Another embodiment of the present invention proposes an SVD algorithm that enjoys the additional advantage of a narrower search interval for the eigen-values and, hence, a faster eigen-values search. It is based on applicant's finding that the bound described by Roger A. Horn & Charles R. Johnson in the book: "Matrix Analysis", Cambridge university press, 1985, US (hereinafter [Horn]), p. 193, can be utilized to narrow the search window of eigen-values in any SVD computation. The search window is further narrowed by combining this tool with the Householder technique of [Matrix] that produces an intermediate tri-diagonal matrix, which can be utilized for calculating a narrow search window.

Detailed examples of the invention's applications will now be presented in a setting that consists of the following elements: An N antenna module receiving signals from an M antenna module, where $N \geq M$. H is the N×M flat fading complex channel matrix, possibly representing a sub-carrier in an OFDM scheme whose (i,j) entry stands for the gain of the channel from antenna j to antenna i. The received signal is given by $y = H \cdot x + v$, where x is the complex M-dimensional transmit signal, $v \in C^N$ is an additive white Gaussian noise (AWGN). It is supposed that normalization took place such that $E^*(v \cdot v^*) = I_{N \times N}$ and, unless otherwise stated, $P \equiv E(x \cdot x^*) = I_{M \times M}$.

A fundamental MIMO transmission scheme with effective (usually linearly-processed) channel matrix G, is as follows: G is N×M complex effective channel matrix, $N \geq M$ and $y = G \cdot x + v$ is the N-dimensional received signal. Here $x = [x_1, \ldots, x_N]^T$ is N dimensional transmit signal, where $x_i$ is the i-transmit-stream with transmit-energy $p_i$, v is N dimensional AWGN. This setting assumes that the i-receive [possibly virtual] antenna decodes the stream directed to it by the i-transmit [perhaps virtual] antenna. The resulting i-stream equation is:

$$y_i = g_{ii} \cdot x_i + \Sigma_{1 \leq j \leq N, j \neq i} g_{ij} \cdot x_j + v_i$$

where $x_i$ is the desired signal and the rest is interference plus noise. The resulting SINR is:

$$SINR_i = p_i \cdot |g_{ii}|^2 \cdot (1 + \Sigma_{1 \leq j \leq N, j \neq i} p_j \cdot |g_{ij}|^2)^{-1}$$

This observation will be useful in the following where we discuss situations of G with enhanced diagonal, as occurs, for example, as a result of approximate SVD processing.

I. The fundamental scheme of this invention. All embodiments of the present invention have in common the following fundamental scheme of MMSE receiver that follows unitary preprocessing at the transmitter.

MMSE matrix definition: For any N×M matrix G we define the respective N×M MMSE matrix by:

$$V_G \equiv G \cdot (I_{M \times M} + G^* \cdot G)^{-1}.$$

With standard MMSE technique, the received signal $y_{N \times 1} = H_{N \times M} \cdot x_{M \times 1} + v_{N \times 1}$ is processed as follows, $$y_{mmse} = V_H^* \cdot y$$
$$= (I_{M \times M} + H^* \cdot H)^{-1} \cdot H^* \cdot y$$
$$= (I_{M \times M} + H^* \cdot H)^{-1} \cdot H^* \cdot H \cdot x + (I_{M \times M} + H^* \cdot H)^{-1} \cdot H^* \cdot v.$$

This invention considers preprocessing of an M dimensional vector signal x, prior to transmission, by an M×M unitary matrix U, so that the physically transmitted signal is $U \cdot x$. The fact that U is unitary guarantees preservation of transmission energy and noise+interference effective energy. Thus, the effective channel is $G = H \cdot U$ and the received signal is given by: $y = H \cdot U \cdot x + v$. In the invention's subsequent schemes, the transmitter is supposed to have at least approximate channel knowledge. This knowledge can be acquired via channel reciprocity in TDD networks or through explicit feedback.

The receiver is required to approximately know the effective channel $H \cdot U$. In practice, it will probably estimate it via pilot symbols that were processed by U and, hence, went through the effective channel $G = H \cdot U$. The optimal linear receiver scheme is MMSE on $H \cdot U$, which maximizes the rate of each stream independently of the others.

The MMSE matrix with respect to the effective channel $H \cdot U$, is thus given by:

$$V_{HU} = U \cdot H \cdot (I_{M \times M} + U^* \cdot H^* \cdot H \cdot U)^{-1}.$$

The MMSE received-signal with such preprocessing is given by:

$$y' = (V_{HU})^* \cdot y$$
$$= (I_{M \times M} + U^* \cdot H^* \cdot H \cdot U)^{-1} \cdot U^* \cdot H^* \cdot H \cdot U \cdot x +$$
$$(I_{M \times M} + U^* \cdot H^* \cdot H \cdot U)^{-1} \cdot U^* \cdot H^* \cdot v.$$

The goal of any effective processing of this type is to find such U for which $W \equiv U^* \cdot H^* \cdot H \cdot U$ has as large as possible portion of its mass (measured by Frobenius norm) concentrated on the diagonal and to do so with a practical amount of computations. There is a trade-off between the level of diagonalization of W and the amount of computations required to produce U.

II. Hybrid QR Decomposition Transmitter and MMSE Receiver (QR-MMSE)

As stated above, this scheme provides an effective channel matrix that is lower triangular, which means that each stream is interfered only by streams of lower index. Roughly speaking, it goes half way toward the conventional SVD scheme by "cleaning" half the overall interference. The rest of the work is due to the MMSE optimal capability in interference reduction. Simulations show that the resulting throughput is in fact half way between MMSE and SVD. Its complexity it much lower than SVD, in fact closer to MMSE than to SVD.

In the present embodiment, the transmitter performs QR decomposition of H: $H = L \cdot U^*$, where L is lower triangular and U is unitary. In fact, the transmitter calculates only U, which significantly reduces complexity. When $x \in C^M$ is the desired vector signal, the transmit signal is $U \cdot x$. The effective channel is $L = H \cdot U$ and the received signal is given by: $y = L \cdot x + n$.

The receiver's channel estimation is low complexity, due to the fact that L is lower triangular, so there are fewer entries to assess. The receiver computes an MMSE matrix $V_L = L \cdot (I_{M \times M} + L^* \cdot L)^{-1}$, which is relatively low complexity due [again] to the fact that L is lower triangular. The resulting MMSE-processed channel is: $y' = (V_L)^* \cdot y = (I_{M \times M} + L^* \cdot L)^{-1} \cdot L^* \cdot L \cdot x + (I_{M \times M} + L^* \cdot L)^{-1} \cdot L^* \cdot v$.

In one application of the invention, the transmitter performs QR decomposition via the Householder matrix. A useful reduced complexity algorithm that performs QR through Householder matrix is described by [Matrix]. The Householder QR scheme has the additional advantage of being almost a sub-routine of the SVD. Thus, when an SVD mechanism is present, this scheme can be implemented, with less hardware and development time.

III. Hybrid Bi-Diagonalization Transmitter and MMSE Receiver (Bi-Diag-MMSE)

Definitions of Bi and Tri Diagonal Matrices

An n×n matrix B is called bi-diagonal if for all $1 \leq i, j \leq n$, for $j < i$ or $j > i+1$ $[B]_{ij} = 0$. Thus, it is of the form $$B = \begin{pmatrix} d_1 & f_1 & 0 & \cdots & & 0 \\ 0 & d_2 & f_2 & 0 & & \cdot \\ \cdot & 0 & \cdot & \cdot & & \cdot \\ \cdot & & & \cdot & \cdot & \cdot \\ \cdot & & & & \cdot & \cdot \\ \cdot & & & & \cdot & f_{n-1} \\ 0 & \cdot & \cdot & & 0 & d_n \end{pmatrix}$$

An Hermitian n×n matrix T is called here tri-diagonal when for all $1 \leq i, j \leq n$ such that $j<i-1$ or $j>i+1$: $[T]_{ij}=0$. That is, it is of the form (with $a_i \geq 0$)

$$T = \begin{pmatrix} a_1 & b_1 & 0 & \cdots & & 0 \\ b_1^* & a_2 & b_2 & 0 & & \cdot \\ \cdot & b_2^* & \cdot & \cdot & & \cdot \\ \cdot & & & \cdot & \cdot & \cdot \\ \cdot & & & & \cdot & \cdot \\ \cdot & & & & \cdot & b_{n-1} \\ 0 & \cdot & \cdot & & b_{n-1}^* & a_n \end{pmatrix}$$

Theorem 1 [Matrix]: Every $H \in C^{N \times M}$ can be decomposed in the form of $H=V \cdot B \cdot U^*$ where both $U \in C^{M \times M}$ and $V \in C^{N \times M}$ have orthonormal columns, each is formed from the product of M−1 Householder matrices, and $B \in C^{M \times M}$ is bi-diagonal.

The transmitter performs this bi-diag decomposition on the channel H, $H=\hat{H}=V \cdot B \cdot U^* (V \in C^{N \times M}, U \in C^{M \times M}$ have orthonormal columns, $B \in C^{M \times M}$ is bi-diagonal). When $x \in C^M$ is the desired vector signal, the transmit signal is $U \cdot x$. The effective channel is $G=V \cdot B=H \cdot U$, hence $G^* \cdot G=B^* \cdot B$, which is a tri-diagonal. The received signal is given by: $y=G \cdot x+v$ and MMSE processing of G gives:

$$y_{mmse} = V_G^* \cdot y$$
$$= (I_{M \times M} + G^* \cdot G)^{-1} \cdot G^* \cdot y$$
$$= (I_{M \times M} + B^* \cdot B)^{-1} \cdot B^* \cdot B \cdot x + (I_{M \times M} + B^* \cdot B)^{-1} \cdot G^* \cdot v.$$

The relative advantage of this scheme is rooted in the fact that the interference of the processed channel B appears to be much smaller than that of the triangular matrix of the QR decomposition, and the increase in complexity cost is moderate.

Preprocessing by Jacobi rotations. Following the scheme of [Matrix 8.4] we define for any given dimension n>1 and $1 \leq p<q \leq n$ and complex numbers z, w satisfying $|z|^2+|w|^2=1$, the respective n×n Jacobi (also called Givens) matrix by $$J = J(p, q, z, w)$$
$$\equiv \begin{bmatrix} 1 & 0 & \cdots & 0 & \cdots & 0 & \cdots & 0 \\ 0 & 1 & & \cdot & & \cdot & & \cdot \\ \cdot & & \cdot & \cdot & & \cdot & & \cdot \\ \cdot & & & \cdot & & \cdot & & \cdot \\ 0 & \cdots & & z & \cdots & w & \cdots & 0 \\ \cdot & & & \cdot & & \cdot & & \cdot \\ \cdot & & & & \cdot & & \cdot & \cdot \\ \cdot & & & -w^* & \cdots & z^* & & \cdot \\ 0 & \cdots & & \cdot & & & \cdots & 0 \\ \cdot & & & \cdot & & & & \cdot \\ \cdot & & & & & & \cdot & 0 \\ 0 & \cdots & 0 & \cdots & 0 & \cdots & 0 & 1 \end{bmatrix}$$

where
$[J]_{p,p} = z$
$[J]_{q,q} = z^*$
$[J]_{p,q} = w$
$[J]_{q,p} = -w^*$ and for all $1 \leq i,j \leq n$ such that $i \notin \{p,q\}$ and $j \notin \{p,q\}$.

$[J]_{i,j}=0$ if $i \neq j$
$[J]_{i,i}=1$

It is very easy to verify that J is unitary. For a given n×n Hermitian matrix A, our choice of (z,w) would be such that $$(*) B = \begin{bmatrix} z^* & -w \\ w^* & z \end{bmatrix} \cdot \begin{bmatrix} a_{pp} & a_{pq} \\ a_{qp} & a_{qq} \end{bmatrix} \cdot \begin{bmatrix} z & w \\ -w^* & z^* \end{bmatrix}$$

is diagonal.

In the context of the present invention, this procedure is done as a step in the linear preprocessing done by the transmitter, where A is unitarily equivalent to $H^*H$. Fast and stable computation of (z, w) satisfying (*) can be done according to [Matrix 8.4]. Due to (*), the impact of the diagonalization, $C=J^*AJ$, is that the off-diagonal sum of (absolute values) squares is decreased by $2|a_{pq}|^2$. Hence, such iteration would preferably choose (p,q) such that $|a_{pq}|$ is maximized. Jacobi iterations can be applied as enhancement of other embodiments or as stand-alone preprocessing. In any event, they always reduce mutual interference between the MIMO streams.

IV. Hybrid SVD Transmitter with QR Corrections and MMSE Receiver (SVD-QR-MMSE)

According to yet another embodiment of the invention, SVD can be performed periodically, on a subset of the frequency sub-carriers, resulting in a diagonal matrix of the resulting processed channel, i.e., interference minimization. In this embodiment, QR preprocessing is routinely performed by the transmitter (as is done in QR-MMSE) and SVD is performed periodically. OFDM is probably the most suitable platform for describing this embodiment. Consider such symbol/sub-carrier where the transmitter does full SVD decomposition on the respective channel H: $H=\hat{H}=V \cdot D \cdot U^* (V \in C^{N \times M}, U \in C^{M \times M}$ have orthonormal columns $D \in C^{M \times M}$ is non-negative diagonal).

The receiver's scheme continues throughout as before, to be MMSE on the effective channel. On the transmitter side, on the time and frequency axes, in between sub-carriers where SVD is performed, the channel tends to change. In the subsequent discussion, $H_e$ will stand for the channel matrix of some randomly chosen sub-carrier and H is the channel of the nearest sub-carrier for which SVD was executed. As long as $H_e$ is relatively close to H, the transmit signal remains $U \cdot x$, where x is the input signal, and the SVD decomposition of H is given by $H = V \cdot D \cdot U^*$.

Once the transmitter estimates says that the current channel $H_e$ has gotten too far from the above H for which the last SVD was computed, (i.e. when $\|H - H_e\| > \text{threshold}$) it computes:

$$G_1 = V^* \cdot H_e \cdot U.$$

In any event, $G_1$ is assumed to be not very far from the diagonal matrix D. Bearing this in mind, the receiver does QR decomposition of $G_1$: $G_1 = L \cdot Q^*$, where L is lower triangular and Q unitary. In fact, the transmitter calculates only Q, which reduces complexity. We thus have, $$H_e = V \cdot G_1 \cdot U^* = V \cdot L \cdot Q^* \cdot U^*,$$

and hence for $U_1 \equiv U \cdot Q$, $$H_e = V \cdot L \cdot U_1^*.$$

Here $L \in C^{M \times M}$ is triangular and its main mass is expected to be concentrated at the diagonal, $V \in C^{N \times M}$ have orthonormal columns, $U_1 \in C^{M \times M}$ is unitary. When $x \in C^N$ is the desired vector signal, the transmit signal now is: $U_1 \cdot x = U \cdot (Q \cdot x)$. The effective channel is $G = V \cdot L = H_e \cdot U_1$. It is noted that $G^* \cdot G = L^* \cdot L$. The received signal is given by: $y = G \cdot x + v$ and MMSE processing of G thus gives:

$$\begin{aligned} y_{mmse} &= V_G^* \cdot y \\ &= (I_{M \times M} + G^* \cdot G)^{-1} \cdot G^* \cdot y \\ &= (I_{M \times M} + G^* \cdot G)^{-1} \cdot G^* \cdot G \cdot x + (I_{M \times M} + G^* \cdot G)^{-1} \cdot G^* \cdot v \\ &= (I_{M \times M} + L^* \cdot L)^{-1} \cdot L^* \cdot L \cdot x + (I_{M \times M} + L^* \cdot L)^{-1} \cdot G^* \cdot v. \end{aligned}$$

Simulations show that this achieves near SVD rates.

V. Reduced SVD Complexity Utilizing Narrow Search Window of Eigen-Values.

Narrowing the search window of eigenvalues in the SVD computation can be accomplished by application of [Horn] majorization theorem at p. 193 (see below). The definition at [Horn] p. 192 states:

Take $x = (x_1, \ldots, x_n) \in R^N$. A permutation $\pi \in S_n$ that satisfies $x_{\pi(1)} \leq \ldots \leq x_{\pi(n)}$, orders x. Let $x = (x_1, \ldots, x_n) \in R^n$ & $y = (y_1, \ldots, y_n) \in R^n$ and let $\pi \in S_n$ order x and $\sigma \in S_n$ order y. The vector y is said to majorize the vector x if:

(i) for all $k = 1, \ldots, n$: $x_{\pi(1)} + \ldots + x_{\pi(k)} \leq y_{\sigma(1)} + \ldots + y_{\sigma(k)}$ (ii) $x_{\pi(1)} + \ldots + x_{\pi(n)} = y_{\sigma(1)} + \ldots + y_{\sigma(n)}$

[Horn p. 193]'s theorem states a general rule for Hermitian matrix that we find to have an interesting application in our quite remote field of interest, of fast SVD algorithms.

Theorem 2 ([Horn] p. 193)

Let $A = (a_{ij})_{1 \leq i,j \leq n}$ be Hermitian. It then holds that the eigen values of A: $\lambda = (\lambda_1, \ldots, \lambda_n)$, are majorized by the diagonal of A: $a = (a_{11}, a_{22}, \ldots, a_{nn})$.

Corollary to the Theorem

Let A be $n \times n$ Hermitian and $\lambda = (\lambda_1, \ldots, \lambda_n)$ the eigen values of A and $C = (c_{ij})_{1 \leq i,j \leq n} = UAU^*$ where U is unitary, then $c = (c_{11}, c_{22}, \ldots, c_{nn})$ majorizes $\lambda$.

One interesting implication is that the diagonal of $A = H^* H$, majorizes the eigen values of A. Furthermore, the theorem implies that for any $M \times M$ unitary matrix U: the diagonal of $C = U^* H^* H U$ majorizes the eigen values of $A = H^* H$. Accordingly, the present invention provides such U for which the $U^* H^* H U$ diagonal will provide a tight search window for the majorized eigen-values of A. Intuitively, the natural choice for a tight window is through the bi-diagonalization theorem of the above section, which says that H can be decomposed in the form of $H = V \cdot B \cdot U^*$, where B is bi-diagonal, $U \in C^{M \times M}$ unitary and $V \in C^{N \times M}$ has orthonormal columns. It follows that $H^* \cdot H = U \cdot B^* \cdot B \cdot U^*$, that is, the diagonal of the tri-diagonal $B^* \cdot B$ majorizes the eigenvalues of A. This embodiment can be implemented with few extra resources in any SVD algorithm that utilizes bi-diagonalization and, particularly, in the above SVD-QR-MMSE embodiment. This is so since B and $B^* \cdot B$ are computed as part of the SVD algorithm. The subsequent scheme finds the eigen values, one by one, starting with the smallest and proceeding in an increasing order.

Another option is to utilize for this purpose the above QR decomposition, i.e., the existence of an upper triangular matrix R and unitary Q such that $H = QR$. It follows from the above considerations that the diagonal of $R^* R$ majorizes the eigen values.

Fast Search Algorithm for Eigen-Values

Establish by the above a vector $(\sigma_1, \ldots, \sigma_n)$, $0 \leq \sigma_1 \leq \ldots \leq \sigma_n$ that majorizes the vector of eigenvalues $\lambda = (\lambda_1, \ldots, \lambda_n)$, $0 \leq \lambda_1 \leq \ldots \leq \lambda_n$, where $\sigma$ is the matrix' diagonal [or minimum of two diagonals, in the sense of fact below]. The search window for $\lambda_1$ is given by:

$$0 \leq \lambda_1 \leq \sigma_1$$

Inductively, once $\lambda_1, \ldots, \lambda_{k-1}$ are found by iterative methods, the inequality:

$$\pi_{k-1} \leq \lambda_k \leq (\sigma_1, \ldots, \sigma_k) - (\lambda_1, \ldots, \lambda_{k-1})$$

can be used for the search window of $\lambda_k$ through iterative methods as well.

The following fact enables the combination of two majorizations to further narrow the search window (e.g., QR combined with bi-diag):

A Fact Following Theorem 2

Let $x = (x_1, \ldots, x_n)$, $y = (y_1, \ldots, y_n)$, $z = (z_1, \ldots, z_n) \in R^n$ and let $\pi \in S_n$ order x, and $\sigma \in S_n$ order y, and $\tau \in S_n$ order z. If y majorizes x and z majorizes x then: for all $k = 1, \ldots, n$: $x_{\pi(1)} + \ldots + x_{\pi(k)} \leq \min\{y_{\sigma(1)} + \ldots + y_{\sigma(k)}, z_{\tau(1)} + \ldots + z_{\tau(k)}\}$.

| Scheme | No. of antennas | Total transmission power in dB | The ratio of additive channel estimation error variance (relative to channel variance | Throughput in bits per second per Hertz |
|---|---|---|---|---|
| QR-MMSE | M = 4, N = 4 | 20 | 0.00 | 19.9373 |
| SVD | M = 4, N = 4 | 20 | 0.00 | 22.1516 |
| SVD with water-fill | M = 4, N = 4 | 20 | 0.00 | 22.2861 |
| MMSE without any preprocessing | M = 4, N = 4 | 20 | 0.00 | 17.1965 |
| Both-sides-MMSE | M = 4, N = 4 | 20 | 0.00 | 17.7319 |
| SVD-MMSE | M = 4, N = 4 | 20 | 0.25 | 20.8248 |
| SVD | M = 4, N = 4 | 20 | 0.25 | 14.1080 |

SIMULATION RESULTS

-continued

SIMULATION RESULTS

| Scheme | No. of antennas | Total transmission power in dB | The ratio of additive channel estimation error variance (relative to channel variance) | Throughput in bits per second per Hertz |
|---|---|---|---|---|
| SVD-QR-MMSE | M = 4, N = 4 | 20 | 0.25 | 22.0145 |
| SVD-MMSE | M = 4, N = 4 | 20 | 0.5 | 19.2156 |
| SVD | M = 4, N = 4 | 20 | 0.5 | 9.2025 |
| SVD-QR-MMSE | M = 4, N = 4 | 20 | 0.5 | 21.6682 |
| SVD-MMSE | M = 4, N = 4 | 20 | 1 | 17.7283 |
| SVD | M = 4, N = 4 | 20 | 1 | 5.2807 |
| SVD-QR-MMSE | M = 4, N = 4 | 20 | 1 | 20.9707 |

It was found that, when the transmitter does QR decomposition and the receiver does MMSE, the result is half-way between SVD and MMSE. With 6×6 antennas, SVD is 12.5586 dB better than MMSE and 6.1667 dB better than hybrid MMSE-QR. With 4×4 antennas, SVD is 7.5027 dB better than MMSE and 3.6239 dB better than hybrid QR-MMSE. (The translation to SNR dB-gain is: let $R_i = \log_2(1+SNR_i)$, then $SNR_i = 2^{R_i} - 1$).

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method for performing closed loop MIMO communication between two transceivers, the method comprising:
   performing non-SVD unitary linear preprocessing selected from the group consisting of QR decomposition and bi-diagonal decomposition of transmit signals and of a channel matrix in one of said transceivers, when in transmission mode;
   performing MMSE processing on received signals in a second of said transceivers, when in receiving mode, to mitigate mutual interference between MIMO streams;
   said MMSE processing including computing an MMSE matrix with respect to said processed channel matrix; and
   performing SVD periodically in said first of said transceivers when in transmission mode, on a subset of frequency sub-carriers, and performing partial and approximated SVD combined with QR decomposition on other sub-carriers, enabling reduced interference between transmitted streams.

2. The method according to claim 1, wherein:
   said step of performing non-SVD linear preprocessing includes performing sub-optimal linear unitary preprocessing of transmission signals in one of said transceivers, in transmission mode, for transmission of at least two MIMO streams, said linear preprocessing being computed through QR decomposition, or bi-diagonal decomposition.

3. The method according to claim 2, the method comprising:
   performing reduced complexity decomposition of a channel matrix to a product of a unitary matrix (or matrices) and another matrix in one of said transceivers, in transmission mode;
   transmitting signals processed by one or more of these calculated unitary matrices by said transceiver in transmission mode; and
   receiving said signals and processing them by an MMSE filter in a second of said transceivers, in receiving mode.

4. The method according to claim 2, wherein said second transceiver, in transmission mode:
   utilizes previously received pilot signals to estimate channel matrix and/or utilizes explicit CSI previously sent by said first transceiver in transmission mode to compute channel matrix;
   performs said decomposition of said channel matrix to a product of at least one unitary matrix and another matrix; and
   performs said linear preprocessing of transmission signals of said second transceiver.

5. The method according to claim 1, further comprising performing SVD periodically, once per relatively long interval of frequencies, in said first of said transceivers when in transmission mode.

6. A method according to claim 1 for performing closed loop MIMO communication between two transceivers, the method comprising:
   performing decomposition of a channel matrix to a product of at least one unitary matrix and a triangular matrix in one of said transceivers when in transmission mode;
   transmitting a signal processed by at least one of said calculated unitary matrices by said transmitter;
   receiving said pre-processed transmitted signal and processing it by an MMSE filter in a second of said transceivers, in receiving mode.

7. The method according to claim 1 wherein said second transceiver, in transmission mode, utilizes previously received pilots signals to estimate channel matrix or utilizes explicit CSI previously sent by said first transceiver in transmission mode to compute channel matrix, and to perform linear preprocessing of transmission signals of said second transceiver.

8. The method according to claim 1, further comprising performing SVD periodically, once per relatively long interval of frequencies, in transmission mode.

9. The method according to claim 8, wherein:
   said step of performing SVD includes calculating a narrowed search window for eigenvalues resulting from a majorization property of a diagonal with respect to eigen-values valid in a Hermitian matrix.

10. The method according to claim 1, wherein said closed loop MIMO communication between two transceivers is performed during backhaul between two base stations in a wireless communications network having in-band backhaul.

11. The method according to claim 1, wherein:
   said step of performing SVD includes calculating a narrowed search window for eigenvalues resulting from a majorization property of a diagonal with respect to eigen-values valid in a Hermitian matrix.

12. A device for performing closed loop MIMO communication between two transceivers, the device comprising:

a processor in a first of said transceivers for performing, in transmission mode, non-SVD unitary linear preprocessing selected from the group consisting of QR decomposition and bi-diagonal decomposition of transmit signals and of a channel matrix in one of said transceivers, when in transmission mode; and a processor in a second of said transceivers for performing, in reception mode, MMSE processing on signals from said first transceiver, to mitigate mutual interference between MIMO streams, said MMSE processing including computation of an MMSE matrix with respect to said processed channel matrix;

further comprising performing SVD periodically, once per relatively long interval of frequencies, in said first of said transceivers in transmission mode, on a subset of the frequency sub-carriers, and performing partial and approximated SVD combined with QR decomposition on other sub-carriers, enabling reduced interference between transmitted streams.

13. The device according to claim 12, wherein said processor is configured such that closed loop MIMO communication between two transceivers is performed during backhaul between two base stations in a wireless communications network having in-band backhaul.

14. The device according to claim 12, wherein said processor in said first of said transceivers is a processor for performing, in transmission mode, sub-optimal linear unitary preprocessing of transmission signals to be transmitted as at least two MIMO streams, said linear preprocessing being computed through QR decomposition, or bi-diagonal decomposition.

* * * * *